US010789892B2

(12) United States Patent
Patel (10) Patent No.: US 10,789,892 B2
(45) Date of Patent: Sep. 29, 2020

(54) DYNAMIC ILLUMINATION PERSISTENCE FOR ORGANIC LIGHT EMITTING DIODE DISPLAY DEVICE

(71) Applicant: Facebook Technologies, LLC, Menlo Park, CA (US)

(72) Inventor: Nirav Rajendra Patel, San Francisco, CA (US)

(73) Assignee: Facebook Technologies, LLC, Menlo Park, CA (US)

( * ) Notice: Subject to any disclaimer, the term of this patent is extended or adjusted under 35 U.S.C. 154(b) by 599 days.

(21) Appl. No.: 15/067,398

(22) Filed: Mar. 11, 2016

(65) Prior Publication Data

US 2016/0267877 A1    Sep. 15, 2016

Related U.S. Application Data

(60) Provisional application No. 62/131,618, filed on Mar. 11, 2015.

(51) Int. Cl.
G09G 3/3266 (2016.01)
G02B 27/01 (2006.01)
G06F 3/01 (2006.01)
G09G 3/20 (2006.01)

(52) U.S. Cl.
CPC ......... *G09G 3/3266* (2013.01); *G02B 27/017* (2013.01); *G06F 3/011* (2013.01); *G09G 3/2014* (2013.01); *G02B 2027/0118* (2013.01); *G09G 2310/0202* (2013.01); *G09G 2310/0216* (2013.01); *G09G 2320/0626* (2013.01)

(58) Field of Classification Search
CPC .......... G02B 2027/0118; G02B 27/017; G09G 2310/0216; G09G 3/2014; G09G 3/3266; G09G 2320/0626; G09G 2310/0202
See application file for complete search history.

(56) References Cited

U.S. PATENT DOCUMENTS

| 6,583,775 | B1 * | 6/2003 | Sekiya | G09G 3/2081 345/76 |
| 8,525,609 | B1 * | 9/2013 | Sadasivam | H03K 7/08 327/172 |
| 8,896,758 | B2 * | 11/2014 | Funatsu | G09G 3/20 345/690 |
| 2006/0220578 | A1 * | 10/2006 | Park | G09G 3/3225 315/169.3 |
| 2006/0248421 | A1 * | 11/2006 | Choi | G09G 3/3266 714/731 |

(Continued)

*Primary Examiner* — Patrick N Edouard
*Assistant Examiner* — Douglas M Wilson
(74) *Attorney, Agent, or Firm* — Fenwick & West LLP (57) ABSTRACT

A method for dynamically illuminating each pixel row of a display device (e.g., an organic light emitting diode display device) for a given video frame is described. For every video frame, the method comprises enabling the driving of a first row of pixels of the display device for a first time period, where the first row of pixels emits light during the first time period. The method also includes enabling the driving of a second row of pixels of the display device for a second time period, where the second row of pixels emits light during the second time period, and the second time period is different (larger or smaller) from the first time period. The first and second time periods may be dynamically adjusted depending on the image to be displayed.

10 Claims, 4 Drawing Sheets

(56) References Cited

U.S. PATENT DOCUMENTS

| | | | |
|---|---|---|---|
| 2009/0195563 A1* | 8/2009 | Xu | G09G 5/18 345/690 |
| 2014/0028732 A1* | 1/2014 | Kim | G09G 3/3266 345/690 |
| 2016/0187967 A1* | 6/2016 | Sato | G06F 3/011 345/8 |
| 2016/0247456 A1* | 8/2016 | Lin | G09G 3/2022 |

* cited by examiner

DYNAMIC ILLUMINATION PERSISTENCE FOR ORGANIC LIGHT EMITTING DIODE DISPLAY DEVICE

CROSS REFERENCE TO RELATED APPLICATION

This application claims the benefit of U.S. Provisional Patent Application No. 62/131,618, filed Mar. 11, 2015, which is incorporated by reference in its entirety.

BACKGROUND

This invention relates generally to display devices, and more particularly to dynamically controlling illumination persistence of organic light emitting diode display devices.

Electronic displays such as liquid crystal displays (LCD) and organic light emitting diode (OLED) displays can display images with wide dynamic range of luminance. These displays can display videos (i.e., each frame of the displayed video) with a wide dynamic range of luminance. For example, an outdoor image depicting a tree in a dimly lit conditions and a hill in a brightly lit conditions has a wide dynamic range of luminance. Video is typically displayed using progressive scanning technique, where each row of pixels of the display is displayed sequentially from top to bottom.

Conventionally, each pixel row is illuminated for a fixed period of time based on the refresh rate of the display irrespective of the dynamic range of luminance of the displayed image or video. For example, a video display resolution of 1080 p at 60 Hz refresh rate indicates that each frame of the video is displayed for about 16.67 ms (i.e., ⅟60 sec). Each pixel row of the 1080 pixel rows is illuminated for a fixed amount of time such that all 1080 pixel rows are displayed sequentially within 16.67 ms.

SUMMARY

A method for dynamically illuminating each pixel row of a display device (e.g., an organic light emitting diode (OLED) display device) for a given video frame is described. For every video frame, the method includes enabling the driving of a first row of pixels of the display device for a first time period, where the first row of pixels emits light during the first time period. The method also includes enabling the driving of a second row of pixels of the display device for a second time period, where the second row of pixels emits light during the second time period, and the second time period is different (larger or smaller) from the first time period.

In one embodiment, the first and second time periods may be set based on a brightness level indicated by the given frame of video (e.g., a first video frame) corresponding to the first row of pixels and second row of pixels respectively. For example, the first time period increases as the brightness level indicated by the video frame corresponding to the first row of pixels increases and similarly the second time period increases as the brightness level indicated by the video frame corresponding to the second row of pixels increases. The first and second time periods may be selected as a multiple of a time period of a pixel clock signal that provides clock signal to the display device.

In one embodiment, the first and second time periods may be dynamically adjusted for the first video frame depending on the image to be displayed for the first video frame. For example, the time period for enabling the first row of pixels for another video frame may be different from the first time period. Similarly, the time period for enabling the second row of pixels for another video frame may be different from the second time period.

In one embodiment, the display device includes a plurality of pixels at intersections of a plurality of scan lines and a plurality of data lines. The display device may also include a scan driver configured to enable pixels coupled to a selected one of the scan lines and a data driver configured to drive data voltages to the pixels coupled to the selected one of the scan lines. The data driver may include a control circuitry configured to control an amount of time the selected one of the scan lines is enabled such that for a given frame of video being displayed on the display device, a first row of pixels is enabled for a first time period of the given frame and a second row of pixels is enabled for a second time period of the given frame that is different from the first time period. The first row of pixels emits light during the first time period and the second row of pixels emits light during the second time period.

In one embodiment, the control circuitry comprises a plurality of counter circuits, where each counter circuit is configured to enable one or more pixels corresponding to one of the scan lines. For example, a first counter circuit that is configured to enable the first row of pixels is set to a first value corresponding to a number of clock periods within the first time period and a second counter circuit that is configured to enable the second row of pixels is set to a second value corresponding to a number of clock periods within the second time period.

In some embodiments, the OLED display device is incorporated into a virtual reality (VR) headset of a VR system.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

System Overview

Figure 1:
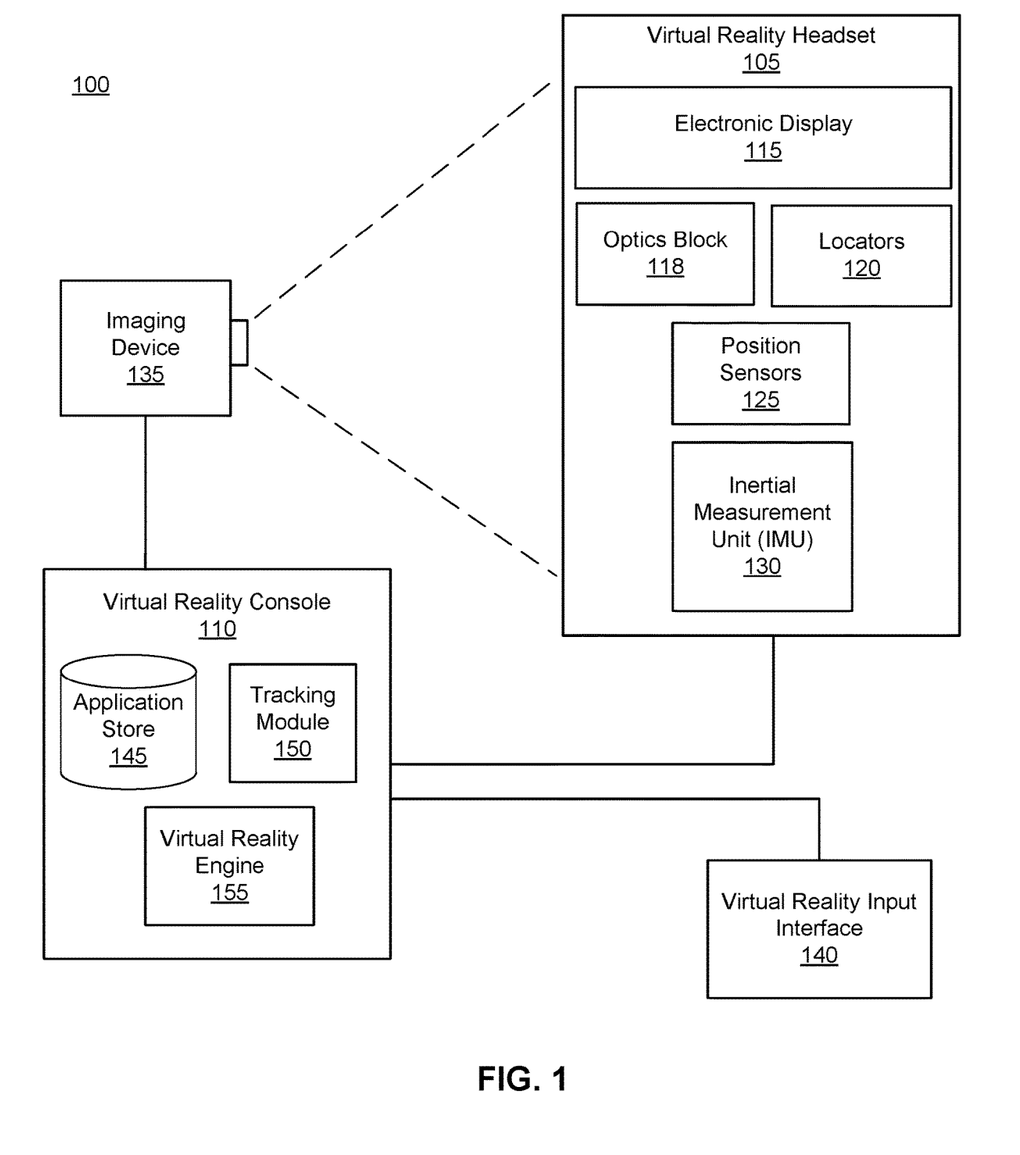
FIG. 1 is a block diagram of a system environment including a virtual reality system, in accordance with an embodiment.

FIG. 1 is a block diagram of a virtual reality (VR) system environment 100 in which a VR console 110 operates. The system environment 100 shown by FIG. 1 comprises a VR headset 105, an imaging device 135, and a VR input interface 140 that are each coupled to the VR console 110. While FIG. 1 shows an example system 100 including one VR headset 105, one imaging device 135, and one VR input interface 140, in other embodiments any number of these components may be included in the system 100. For example, there may be multiple VR headsets 105 each having an associated VR input interface 140 and being monitored by one or more imaging devices 135, with each VR headset 105, VR input interface 140, and imaging devices 135 communicating with the VR console 110. In alternative configurations, different and/or additional components may be included in the system environment 100.

The VR headset 105 is a head-mounted display that presents media to a user. Examples of media presented by the VR head set include one or more images, video, audio, or some combination thereof. In some embodiments, audio is presented via an external device (e.g., speakers and/or headphones) that receives audio information from the VR headset 105, the VR console 110, or both, and presents audio data based on the audio information. An embodiment of the VR headset 105 is further described below in conjunction with FIGS. 2A and 2B. The VR headset 105 may comprise one or more rigid bodies, which may be rigidly or non-rigidly coupled to each other together. A rigid coupling between rigid bodies causes the coupled rigid bodies to act as a single rigid entity. In contrast, a non-rigid coupling between rigid bodies allows the rigid bodies to move relative to each other.

The VR headset 105 includes an electronic display 115, an optics block 118, one or more locators 120, one or more position sensors 125, and an inertial measurement unit (IMU) 130. The electronic display 115 displays images to the user in accordance with data received from the VR console 110. In various embodiments, the electronic display 115 may comprise a single electronic display or multiple electronic displays (e.g., a display for each eye of a user). Examples of the electronic display 115 include: a liquid crystal display (LCD), an organic light emitting diode (OLED) display, an active-matrix organic light-emitting diode display (AMOLED), a passive-matrix organic light-emitting diode display (PMOLED), some other display, or some combination thereof.

The electronic display 115 includes a display area comprising a plurality of pixels, where each pixel is a discrete light emitting component. An example embodiment of the pixel structure of electronic display 115 is described below with reference to FIG. 3. In some embodiments, each pixel comprises a plurality of sub-pixels, where a sub-pixel is a discrete light emitting component. Different sub-pixels are separated from each other by dark space. For example, a sub-pixel emits red light, yellow light, blue light, green light, white light, or any other suitable color of light. In some embodiments, images projected by the electronic display 115 are rendered on the sub-pixel level. This is distinct from, say an RGB (red-green-blue) layout, which has discrete red, green, and blue pixels (red, green, and blue) and each pixel in the RGB layout includes a red sub-pixel, which is adjacent to a green sub-pixel that is adjacent to a blue sub-pixel; the red, green, and blue sub-pixels operate together to form different colors. In an RGB layout a sub-pixel in a pixel is restricted to working within that pixel. However, in some embodiments, sub-pixels in the electronic display operate within multiple "logical" pixels in their surrounding vicinity to form different colors. The sub-pixels are arranged on the display area of the electronic display 115 in a sub-pixel array. Examples of a sub-pixel array include PENTILE® RGBG, PENTILE® RGBW, some another suitable arrangement of sub-pixels that renders images at the sub-pixel level. In some embodiments, one or more adjacent sub-pixels are of the same color.

In various embodiments, the display area of the electronic display 115 arranges sub-pixels in a hexagonal layout, in contrast to a rectangular layout used by conventional RGB type systems. Moreover, some users are more comfortable viewing images which appear to have been generated via a rectangular layout of sub-pixels.

The optics block 118 magnifies received light, corrects optical errors associated with the image light, and presents the corrected image light is presented to a user of the VR headset 105. An optical element may be an aperture, a Fresnel lens, a convex lens, a concave lens, a filter, or any other suitable optical element that affects the blurred image light. Moreover, the optics block 118 may include combinations of different optical elements. In some embodiments, one or more of the optical elements in the optics block 118 may have one or more coatings, such as anti-reflective coatings.

Magnification of the image light by the optics block 118 allows the electronic display 115 to be physically smaller, weigh less, and consume less power than larger displays. Additionally, magnification may increase a field of view of the displayed media. For example, the field of view of the displayed media is such that the displayed media is presented using almost all (e.g., 110 degrees diagonal), and in some cases all of the user's field of view.

The locators 120 are objects located in specific positions on the VR headset 105 relative to one another and relative to a specific reference point on the VR headset 105. A locator 120 may be a light emitting diode (LED), a corner cube reflector, a reflective marker, a type of light source that contrasts with an environment in which the VR headset 105 operates, or some combination thereof. In embodiments where the locators 120 are active (i.e., an LED or other type of light emitting device), the locators 120 may emit light in the visible band (~380 nm to 750 nm), in the infrared (IR) band (~750 nm to 1 mm), in the ultraviolet band (10 nm to 380 nm), some other portion of the electromagnetic spectrum, or some combination thereof.

In some embodiments, the locators 120 are located beneath an outer surface of the VR headset 105, which is transparent to the wavelengths of light emitted or reflected by the locators 120 or is thin enough to not substantially attenuate the wavelengths of light emitted or reflected by the locators 120. Additionally, in some embodiments, the outer surface or other portions of the VR headset 105 are opaque in the visible band of wavelengths of light. Thus, the locators 120 may emit light in the IR band under an outer surface that is transparent in the IR band but opaque in the visible band.

The IMU 130 is an electronic device that generates fast calibration data based on measurement signals received from one or more of the position sensors 125. A position sensor 125 generates one or more measurement signals in response to motion of the VR headset 105. Examples of position sensors 125 include: one or more accelerometers, one or more gyroscopes, one or more magnetometers, another suitable type of sensor that detects motion, a type of sensor used for error correction of the IMU 130, or some combination thereof. The position sensors 125 may be located external to the IMU 130, internal to the IMU 130, or some combination thereof.

Based on the one or more measurement signals from one or more position sensors 125, the IMU 130 generates fast calibration data indicating an estimated position of the VR headset 105 relative to an initial position of the VR headset 105. For example, the position sensors 125 include multiple accelerometers to measure translational motion (forward/back, up/down, left/right) and multiple gyroscopes to measure rotational motion (e.g., pitch, yaw, roll). In some embodiments, the IMU 130 rapidly samples the measurement signals and calculates the estimated position of the VR headset 105 from the sampled data. For example, the IMU 130 integrates the measurement signals received from the accelerometers over time to estimate a velocity vector and integrates the velocity vector over time to determine an estimated position of a reference point on the VR headset 105. Alternatively, the IMU 130 provides the sampled measurement signals to the VR console 110, which determines the fast calibration data. The reference point is a point that may be used to describe the position of the VR headset 105. While the reference point may generally be defined as a point in space; however, in practice the reference point is defined as a point within the VR headset 105 (e.g., a center of the IMU 130).

The IMU 130 receives one or more calibration parameters from the VR console 110. As further discussed below, the one or more calibration parameters are used to maintain tracking of the VR headset 105. Based on a received calibration parameter, the IMU 130 may adjust one or more IMU parameters (e.g., sample rate). In some embodiments, certain calibration parameters cause the IMU 130 to update an initial position of the reference point so it corresponds to a next calibrated position of the reference point. Updating the initial position of the reference point as the next calibrated position of the reference point helps reduce accumulated error associated with the determined estimated position. The accumulated error, also referred to as drift error, causes the estimated position of the reference point to "drift" away from the actual position of the reference point over time.

The imaging device 135 generates slow calibration data in accordance with calibration parameters received from the VR console 110. Slow calibration data includes one or more images showing observed positions of the locators 120 that are detectable by the imaging device 135. The imaging device 135 may include one or more cameras, one or more video cameras, any other device capable of capturing images including one or more of the locators 120, or some combination thereof. Additionally, the imaging device 135 may include one or more filters (e.g., used to increase signal to noise ratio). The imaging device 135 is configured to detect light emitted or reflected from locators 120 in a field of view of the imaging device 135. In embodiments where the locators 120 include passive elements (e.g., a retroreflector), the imaging device 135 may include a light source that illuminates some or all of the locators 120, which retroreflect the light towards the light source in the imaging device 135. Slow calibration data is communicated from the imaging device 135 to the VR console 110, and the imaging device 135 receives one or more calibration parameters from the VR console 110 to adjust one or more imaging parameters (e.g., focal length, focus, frame rate, ISO, sensor temperature, shutter speed, aperture, etc.).

The VR input interface 140 is a device that allows a user to send action requests to the VR console 110. An action request is a request to perform a particular action. For example, an action request may be to start or end an application or to perform a particular action within the application. The VR input interface 140 may include one or more input devices. Example input devices include: a keyboard, a mouse, a game controller, or any other suitable device for receiving action requests and communicating the received action requests to the VR console 110. An action request received by the VR input interface 140 is communicated to the VR console 110, which performs an action corresponding to the action request. In some embodiments, the VR input interface 140 may provide haptic feedback to the user in accordance with instructions received from the VR console 110. For example, haptic feedback is provided when an action request is received, or the VR console 110 communicates instructions to the VR input interface 140 causing the VR input interface 140 to generate haptic feedback when the VR console 110 performs an action.

The VR console 110 provides media to the VR headset 105 for presentation to the user in accordance with information received from one or more of: the imaging device 135, the VR headset 105, and the VR input interface 140. In the example shown in FIG. 1, the VR console 110 includes an application store 145, a tracking module 150, and a virtual reality (VR) engine 155. Some embodiments of the VR console 110 have different modules than those described in conjunction with FIG. 1. Similarly, the functions further described below may be distributed among components of the VR console 110 in a different manner than is described here.

The application store 145 stores one or more applications for execution by the VR console 110. An application is a group of instructions, that when executed by a processor, generates content for presentation to the user. Content generated by an application may be in response to inputs received from the user via movement of the HR headset 105 or the VR interface device 140. Examples of applications include: gaming applications, conferencing applications, video playback application, or other suitable applications.

The tracking module 150 calibrates the VR system 100 using one or more calibration parameters and may adjust one or more calibration parameters to reduce error in determination of the position of the VR headset 105. For example, the tracking module 150 adjusts the focus of the imaging device 135 to obtain a more accurate position for observed locators on the VR headset 105. Moreover, calibration performed by the tracking module 150 also accounts for information received from the IMU 130. Additionally, if tracking of the VR headset 105 is lost (e.g., the imaging device 135 loses line of sight of at least a threshold number of the locators 120), the tracking module 140 re-calibrates some or all of the system environment 100.

The tracking module 150 tracks movements of the VR headset 105 using slow calibration information from the imaging device 135. The tracking module 150 determines positions of a reference point of the VR headset 105 using observed locators from the slow calibration information and a model of the VR headset 105. The tracking module 150 also determines positions of a reference point of the VR headset 105 using position information from the fast calibration information. Additionally, in some embodiments, the tracking module 150 may use portions of the fast calibration information, the slow calibration information, or some combination thereof, to predict a future location of the headset 105. The tracking module 150 provides the estimated or predicted future position of the VR headset 105 to the VR engine 155.

The VR engine 155 executes applications within the system environment 100 and receives position information, acceleration information, velocity information, predicted future positions, or some combination thereof of the VR headset 105 from the tracking module 150. Based on the received information, the VR engine 155 determines content to provide to the VR headset 105 for presentation to the user. For example, if the received information indicates that the user has looked to the left, the VR engine 155 generates content for the VR headset 105 that mirrors the user's movement in a virtual environment. Additionally, the VR engine 155 performs an action within an application executing on the VR console 110 in response to an action request received from the VR input interface 140 and provides feedback to the user that the action was performed. The provided feedback may be visual or audible feedback via the VR headset 105 or haptic feedback via the VR input interface 140.

Figure 2A:
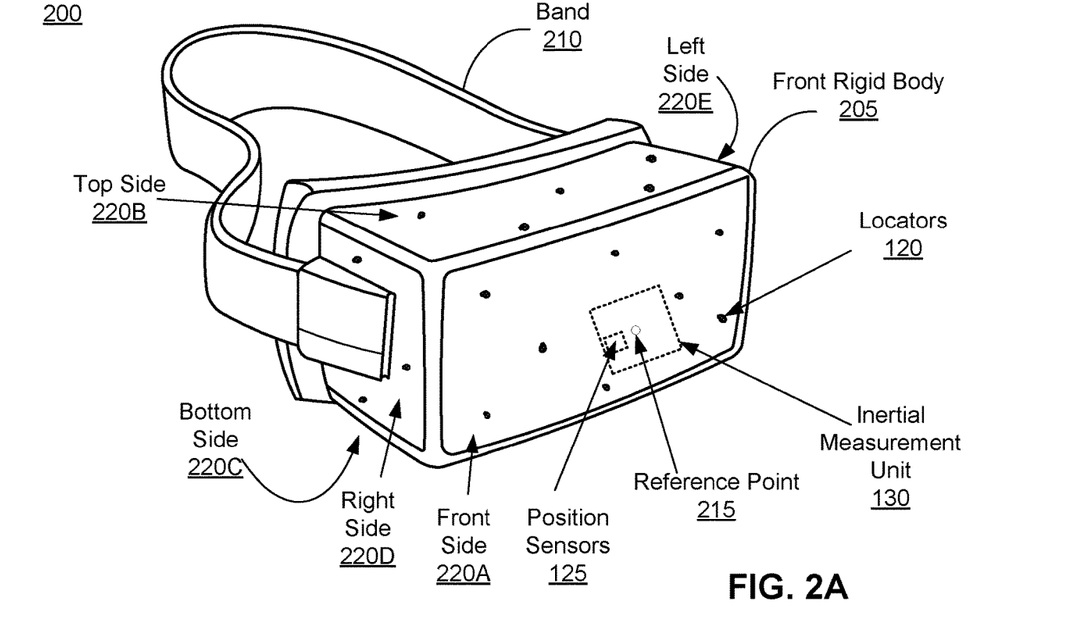
FIG. 2A is a diagram of a virtual reality headset, in accordance with an embodiment.

FIG. 2A is a diagram of a virtual reality (VR) headset, in accordance with an embodiment. The VR headset 200 is an embodiment of the VR headset 105, and includes a front rigid body 205 and a band 210. The front rigid body 205 includes one or more electronic display elements of the electronic display 115 (not shown), the IMU 130, the one or more position sensors 125, and the locators 120. In the embodiment shown by FIG. 2A, the position sensors 125 are located within the IMU 130, and neither the IMU 130 nor the position sensors 125 are visible to the user.

The locators 120 are located in fixed positions on the front rigid body 205 relative to one another and relative to a reference point 215. In the example of FIG. 2A, the reference point 215 is located at the center of the IMU 130. Each of the locators 120 emit light that is detectable by the imaging device 135. Locators 120, or portions of locators 120, are located on a front side 220A, a top side 220B, a bottom side 220C, a right side 220D, and a left side 220E of the front rigid body 205 in the example of FIG. 2A.

Figure 2B:
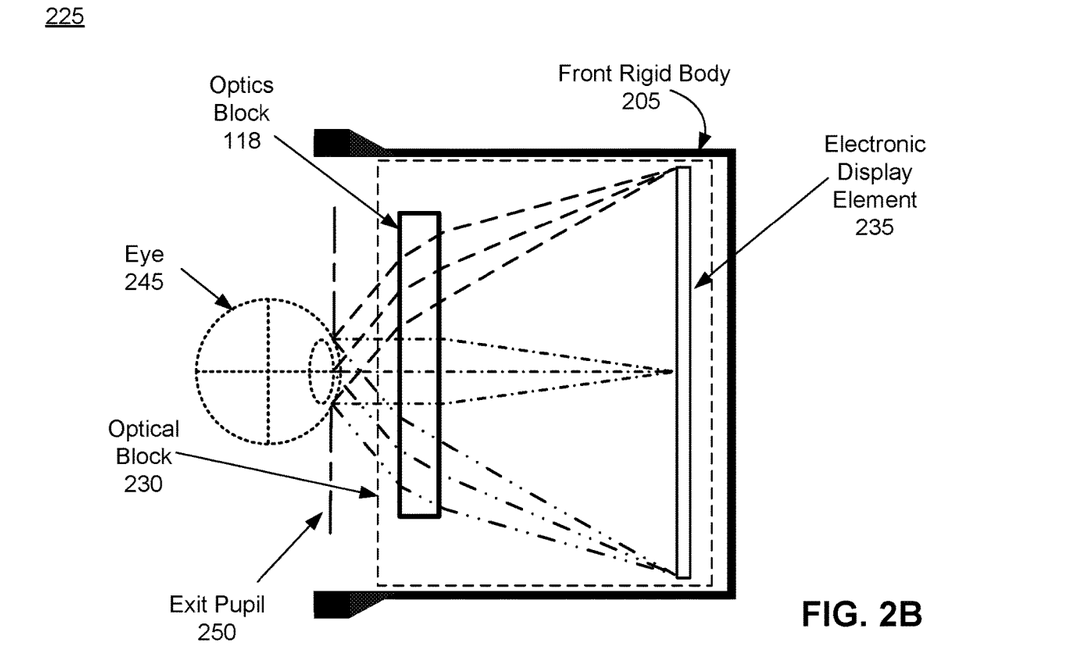
FIG. 2B is a cross section of a front rigid body of the VR headset in FIG. 2A, in accordance with an embodiment.

FIG. 2B is a cross section 225 of the front rigid body 205 of the embodiment of a VR headset 200 shown in FIG. 2A. As shown in FIG. 2B, the front rigid body 205 includes an optical block 230 that provides altered image light to an exit pupil 250. The exit pupil 250 is the location of the front rigid body 205 where a user's eye 245 is positioned. For purposes of illustration, FIG. 2B shows a cross section 225 associated with a single eye 245, but another optical block, separate from the optical block 230, provides altered image light to another eye of the user. The optical block 230 includes an electronic display element 235 of the electronic display 115, and the optics block 118. An image that may be corrected for any errors is then generated by the optics block 118 magnifying the blurred image light. The optics block 118 directs the corrected image light to the exit pupil 250 for presentation to the user.

Figure 3:
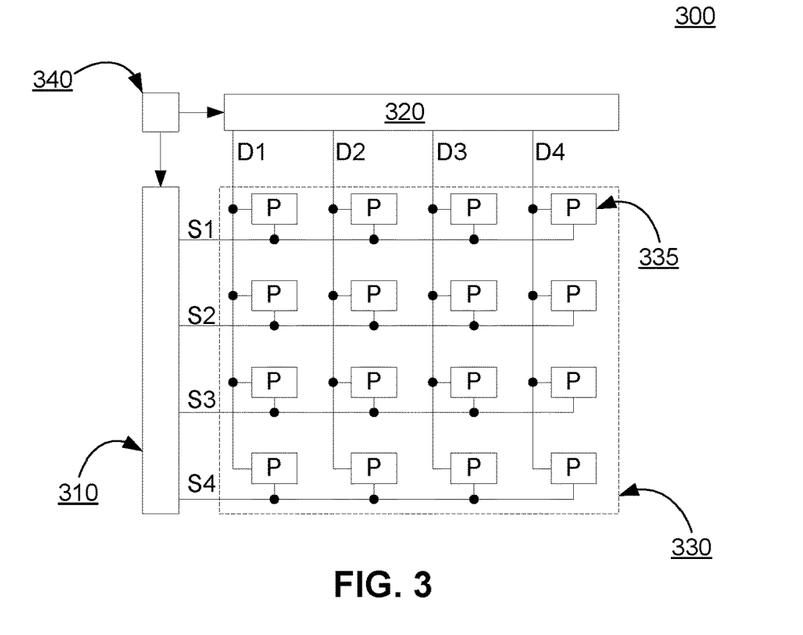
FIG. 3 is a block diagram depicting a pixel arrangement of an organic light emitting diode (OLED) display device, in accordance with an embodiment.

FIG. 3 is a block diagram depicting a pixel arrangement of an organic light emitting diode (OLED) display device, in accordance with an embodiment. In one embodiment, the OLED display device of FIG. 3 can be incorporated as the electronic display 115 of the virtual reality (VR) headset 105 of VR system 100. In other embodiments is the OLED display device of FIG. 3 may be used as some other electronic display, e.g., a computer monitor, a television set, etc. The exemplary pixel arrangement of FIG. 3 includes a 4×4 pixel structure including 4 rows of pixels (pixel rows) and 4 columns of pixels (pixel columns) for simplicity of illustration, although a person skilled in the art would understand that the depicted 4×4 pixel structure is merely exemplary and that the disclosure is applicable to a pixel structure of any size, typically with millions of pixels on the OLED display 300.

Referring to FIG. 3, the OLED display device includes an OLED panel 330, a scan driver 310, a data driver 320, and a timing controller 340. The OLED panel 330 includes a plurality of scan lines S1 through S4 (i.e., S1-S4) and a plurality of data lines D1 through D4 (i.e., D1-D4). A plurality of pixel regions P are defined by the regions that the scan lines S1-S4 and data lines D1-D4 cross each other. These pixel regions P can be arranged in a matrix shape. Each of the pixel regions P (i.e., 335) is electrically connected to one of the scan lines S1-S4 and one of the data lines D1-D4. For example, the scan lines S1-S4 can be electrically connected to the plurality of pixel regions P arranged in a horizontal direction with each of the scan lines S1-S4 associated with a corresponding one of the rows of pixels. The data lines D1-D4 can be electrically connected to the plurality of pixel regions P arranged in a vertical direction with each of the data lines D1-D4 associated with a corresponding one of the columns of pixels. The pixel region P is described in more detail below with reference to FIG. 5.

The scan driver 310 applies scan signals to the pixel regions P through the scan lines S1-S4 to enable the rows associated with the activated scan line for display. The data driver 320 applies data voltages to the pixel regions P through the data lines D1-D4 to provide data voltages to the columns associated with the activated data lines. In some embodiments, a plurality of power voltage lines (not shown) can supply power voltage to the pixel regions P.

The timing controller 340 can apply digital video data RGB to the data driver 320. Also, timing controller 340 can derive timing control signals from vertical/horizontal synchronous signals and a clock signal. The timing control signals are used to control operation timings of the scan driver 310 and the data driver 320.

The OLED display device 300 includes a display area used to display images and a non-display area in which any image is not displayed. The organic light-emitting panel 330 can be included in the display area. The scan driver 310, the data driver 320, and any other drivers can be included in the non-display area. A general operation of the display area of the OLED display device is described below with reference to FIG. 4.

Figure 4:
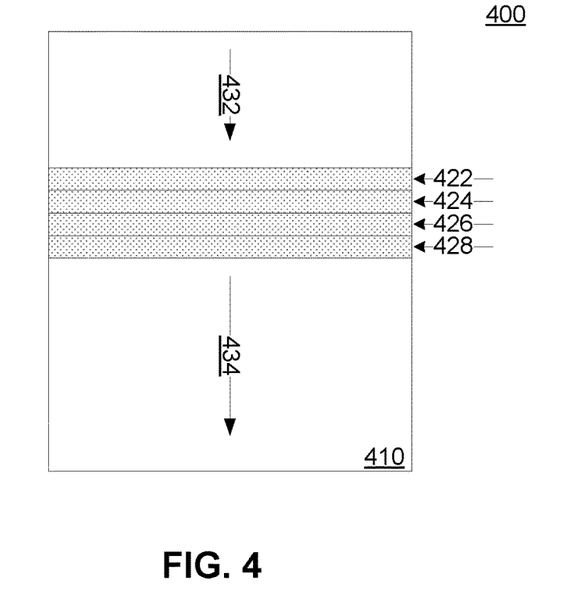
FIG. 4 is a block diagram depicting a display operation of an OLED display device, in accordance with an embodiment.

FIG. 4 is a block diagram depicting a display operation of an OLED display device, in accordance with an embodiment. FIG. 4 includes a display area 410 of the OLED display panel 330. The display area 410 includes N number of pixel rows for a display device with a native display resolution of M×N pixels, where M is the number of pixel columns and N is the number of pixel rows. For example, a display with a native display resolution of 1920×1080 includes 1920 pixel columns and 1080 pixel rows. The display area 410 includes four exemplary pixel rows, 422, 424, 426, and 428.

When a video is displayed on an OLED display device using a video display resolution of 1080 p at 60 Hz refresh rate, each of the 1080 pixel rows is illuminated sequentially from top to bottom for each frame of the video (depicted by arrows 432 and 434). This is called progressive scanning. In one embodiment, each video frame is displayed by sequentially illuminating one pixel row at a time. For example, for the four consecutive pixel rows depicted in FIG. 4, the pixel rows are illuminated one at a time starting with pixel row 422, pixel row 424, pixel row 426, and pixel row 428. Alternatively, a plurality of pixel rows (i.e., a band of pixel rows) can be illuminated together one band at a time, as opposed to a single pixel row at a time. For example, pixel rows 422 and 424 may be illuminated at the same time, and then pixel rows 426 and 428 may be illuminated at the next available time duration. It is understood that there can be overlap of pixel rows between successive bands of pixel rows illuminated in a given frame. An operation of a pixel region (e.g., 335) of a particular pixel row (e.g., 422) is described below with reference to FIG. 5.

Figure 5:
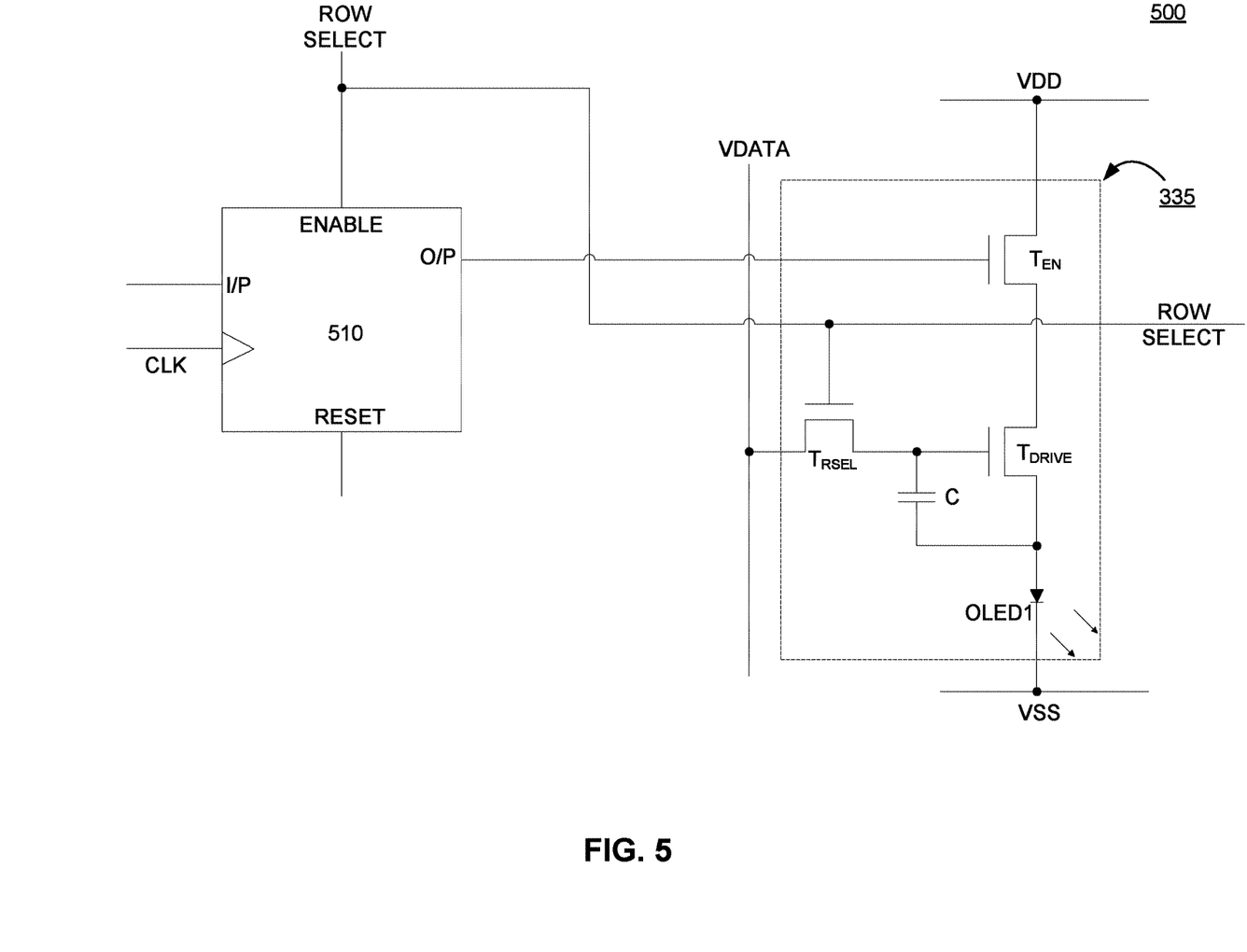
FIG. 5 is a block diagram depicting an implementation of dynamic illumination persistence of an OLED display device, in accordance with an embodiment.

FIG. 5 is a block diagram depicting an implementation of dynamic illumination persistence of an OLED display device, in accordance with an embodiment. FIG. 5 includes counter logic block 510 and a transistor-level diagram of one pixel region 335 of the OLED display. In one embodiment, counter logic block 510 may be included in the scan driver 310 of the OLED display 300. FIG. 5 represents an exemplary embodiment for implementing the concept of dynamic illumination of a pixel row of the display device.

In one embodiment, the counter logic block 510 is a digital counter logic that can count down (and/or up) based on a clock signal CLK. For example, counter logic 510 can be initialized with an input value received at the input terminal I/P. The initialized input value can be a time value that represents a multiple of a clock cycle of a row clock signal. For example, the initialized input value is equal to five clock cycles of row clock signal.

The counter 510 operates as follows. The counter 510 has ENABLE and RESET input signals. The ENABLE terminal is connected to ROW SELECT signal (e.g., a scan line S1 shown in FIG. 3) corresponding to the pixel row including pixel region 335. ROW SELECT is also connected to the gate terminal of row select transistor $T_{RSEL}$ as described below. When the input signal ENABLE is active (i.e., active high or active low), the counter 510 operates to count down (or up) as discussed below. To disable the operation of the counter 510, the input signal RESET is set to be active (i.e., active high or active low). When ENABLE signal is active and when RESET is inactive, the counter 510 counts down (i.e., when configured as a down counter) a received input value for every clock cycle. For example, when the received input value is an integer 5, the counter 510 counts down the input value of 5 for every clock cycle such that after five clock cycles, the output value of the counter 510 is zero. The counter 510 provides an output signal O/P that is logic high as long as the counting down operation results in a non-zero value. For example, for all clock cycles where the counting down produces non-zero value, the output signal O/P provides a logic high (e.g., VDD) signal. And when the counting down operation produces a zero value, the output signal O/P provides a logic low (e.g., VSS or Ground) signal. The clock signal CLK of the counter 510 is same as the row clock signal.

The exemplary pixel region 335 includes three MOS transistors and one capacitor. Transistor $T_{RSEL}$ is configured as a switch and connects between a data line VDATA and a gate of another transistor $T_{DRIVE}$. The gate terminal of transistor $T_{RSEL}$ is connected to a ROW SELECT line that is used to enable a particular pixel row (e.g., a scan line S1 shown in FIG. 3). The drain terminal of $T_{RSEL}$ is connected to the data line VDATA (e.g., data line D1 of FIG. 3) that provides an appropriate voltage level to be used for driving the drive transistor $T_{DRIVE}$. The source terminal of $T_{RSEL}$ is connected to one end of a storage capacitor C and also to a gate terminal of the drive transistor $T_{DRIVE}$.

The gate terminal of the drive transistor $T_{DRIVE}$ is connected to the source terminal of $T_{RSEL}$. The drain terminal of $T_{DRIVE}$ is connected to the source terminal of enable transistor $T_{EN}$, and the source terminal is connected to the anode terminal of an OLED device (i.e., OLED1) of the pixel region. The cathode terminal of OLED1 is connected to the ground reference VSS of the pixel region. The drain terminal of the enable transistor $T_{EN}$ is connected to the power supply VDD of the pixel region, and the gate terminal of $T_{EN}$ is connected to the output terminal O/P of the counter 510 line.

An operation of the pixel region 335 circuit is as follows. A ROW SELECT line corresponding to a particular pixel row becomes active when the pixel row is to be illuminated. When the ROW SELECT line is active to enable the pixel row of pixel region 335, the counter 510 and row select transistor $T_{RSEL}$ are enabled. When the counter 510 is initialized with a non-zero input value, the counter 510 provides an O/P signal at logic high and enables the enable transistor $T_{EN}$. When $T_{RSEL}$ is enabled, $T_{RSEL}$ transfers the data voltage on the VDATA line to the gate of drive transistor $T_{DRIVE}$ (also one end of the capacitor C). Next, as long as there is a path for the current to flow through the drive transistor $T_{DRIVE}$ (i.e., when $T_{EN}$ is enabled), the voltage across the gate and source of $T_{DRIVE}$ (i.e., also stored as voltage across the storage capacitor C) allows the current to flow through $T_{DRIVE}$ and through OLED1. The amount of current flow through OLED1 depends on the voltage difference between the gate and source terminals of $T_{DRIVE}$, which in turn depends on the voltage VDATA effectively stored in the storage capacitor C. A current flow path exists for TDRIVE as long as enable transistor $T_{EN}$ is turned on. As long as the counter 510 value is non-zero, the O/P signal is at logical high such that the enable transistor $T_{EN}$ is enabled to ensure that there is a path for current flow for $T_{DRIVE}$ and OLED1.

For every clock cycle of a row clock signal, the counter 510 counts down its input value. The O/P signal of counter 510 remains at a logical high (i.e., VDD signal) as long as the counter value is non-zero, and accordingly the current flows through OLED1 and OLED1 emits light. When the counter 510 counts down to zero, the O/P signal provides a logical low (i.e., VSS signal), which disables transistor $T_{EN}$. When transistor $T_{EN}$ is disabled, the current path to OLED1 is cut-off and accordingly, the OLED1 does not emit light anymore. Because the ROW SELECT line is common for all the pixels coupled to an entire pixel row including pixel region 335 of the OLED display 300, the entire pixel row is disabled (i.e., not illuminated) when counter 510 provides a zero output signal. In one embodiment, the enable transistor $T_{EN}$ is part of the pixel region 335 such that each pixel region of a pixel row includes a separate enable transistor. Alternatively, the entire pixel row can share one enable transistor $T_{EN}$ that is sufficiently large to be able to provide the necessary current to drive all OLEDs of the pixel row.

By using a separate logical block 510 (e.g., counter 510) for each pixel row of the display device, an illumination time (i.e., a time period when LEDs of a pixel row are emitting light) can be controlled separately and independently for each pixel row. In one embodiment, a time duration for illuminating each pixel row of the OLED display 300 can be dynamically varied based on the characteristics (e.g., brightness of a given frame) of the image (or video) being displayed. For example, a first pixel row is illuminated for a first time period and a second pixel row is illuminated for a second time period, where the second time period is different from the first time period, by setting the counter settings input to the counter logic 510 associated with each of the first and second pixel rows differently. Such counter settings may be generated by, for example, the virtual reality engine 155 in the VR console 110, which is then communicated to the electronic display 115 on the VR headset.

This dynamic variation of illumination time is especially advantageous with videos having a wide dynamic range of luminance. In one embodiment, the first time period is larger than the second time period. For example, when OLED display device 300 of VR system 100 is displaying an outdoor image (or a frame of a video) depicting a tree in a dimly lit conditions and a hill in a brightly lit conditions, it is advantageous to illuminate the pixel row corresponding to the brightly lit hill (e.g., first pixel row) for a longer time duration than the pixel row corresponding to the dimly lit tree (e.g., second pixel row). In such example, if a time duration for illuminating the hill is a first time period and that of the tree is a second time period, the counter logic 510 corresponding to the first pixel row is initialized with a larger value compared to the counter logic 510 corresponding to the second pixel row. In this example, the first time period may be increased as the brightness corresponding to the first pixel row increases and the second time period may be increased as the brightness corresponding to the second pixel row increases.

In one embodiment, a time duration for illuminating each pixel row can be a multiple of a time period of the row clock signal. For example, the first time period illuminating the first pixel row is equal to five clock cycles of row clock signal, and the second time period illuminating the second pixel row is equal to ten clock cycles of row clock signal. In one embodiment, the first datagram of video data corresponding to a pixel row is used to load the associated counter for the pixel row with a value that represents a number of clocks of illumination time. In one embodiment, such video data including the illumination time values for the pixel rows are processed by timing controller 340 and provided to the counter logic 510 in the scan driver 310.

In one embodiment, a time duration for illuminating each band of pixel rows (i.e., more than one pixel row) can be dynamically varied. For example, a first band of pixel rows is illuminated for a first time period and a second band of pixel rows is illuminated for a second time period for one frame, where the second time period is different from the first time period. Then, in a subsequent frame, the first band of pixel rows may be illuminated for a third time period and the second band of pixel rows may be illuminated for a fourth time period for that subsequent frame, where the third and fourth times may be different from the first and second time periods, respectively, allowing dynamic control of the illumination time of each row of the OLED display 300 on a frame by frame basis.

In one embodiment, the concept of dynamically illuminating pixel row(s) can be applied to either progressively scanned video (e.g., 1080p) or interlaced video (1080i).

In one embodiment, a range of brightness for a pixel row can be dynamically changed to increase a brightness resolution for the pixel row. Because an illumination time for each pixel row (or a band of pixel rows) can be controlled independently, brightness resolution of each pixel row (or a band of pixel rows) can also be changed independently. For example, 8-bits (i.e., 0-255 scale) of resolution is used for controlling brightness of the entire OLED display, whose brightness ranges from 0 to 100 nits (candela per square meter). That is, the analog brightness range of the entire OLED display of 0 to 100 nits is mapped to the 8-bit digital range such that each digital step corresponds to about 0.4 nits (i.e., 100/256=0.39). For a given pixel row, if it is determined that the maximum brightness of the pixel row is only 25 nits, then the available 8-bits of digital brightness resolution can be mapped to the analog range of 0 to 25 nits (instead of the entire range of 0 to 100 nits for the whole OLED display) for the given pixel row increasing the brightness resolution for the given pixel row. In this example, each digital step for the given pixel row is increased from 0.4 nits to about 0.1 nits (i.e., 25/256=0.097) after remapping.

The foregoing description of the embodiments of the disclosure has been presented for the purpose of illustration; it is not intended to be exhaustive or to limit the disclosure to the precise forms disclosed. Persons skilled in the relevant art can appreciate that many modifications and variations are possible in light of the above disclosure. For example, while the transistors of the pixel region 335 are depicted as NMOS-type transistors, some or all of the transistors can be implemented as PMOS-type transistors as well. Additionally, the pixel region 335 can be implemented with fewer or additional MOS transistors, and is not limited to the described configuration of three MOS transistors and one capacitor.

The language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosed embodiments are intended to be illustrative, but not limiting, of the scope of the disclosure, which is set forth in the following claims.

What is claimed is:

1. A method for controlling a display device, the method comprising:
for a given frame of video being displayed on the display device:
enabling driving of a first row of pixels of the display device for a first time period of the given frame to emit light during the first time period by setting a first counter circuit to a first value corresponding to a number of clock periods within the first time period, wherein the first counter circuit is configured to enable the first row of pixels;
enabling driving of a second row of pixels of the display device for a second time period of the given frame to emit light during the second time period by setting a second counter circuit to a second value corresponding to a number of clock periods within the second time period, wherein the second counter circuit is configured to enable the second row of pixels, the light being emitted from the second row of pixels during the second time period being different in duration from the light being emitted from the first row of pixels during the first time period, wherein the first time period is set by initializing the first counter circuit to the first value based on a brightness level indicated by the given frame of video corresponding to the first row of pixels, and wherein the second time period is set by initializing the second counter circuit to the second value based on a brightness level indicated by the given frame of video corresponding to the second row of pixels, wherein the first time period increases as the brightness level corresponding to the first row of pixels increases and wherein the second time period increases as the brightness level corresponding to the second row of pixels increases; and
increasing a brightness resolution for a given row of pixels in the display device independently from other rows of pixels in the display device by mapping a digital brightness resolution of the display device to a maximum brightness of the given row of pixels in the given frame when the maximum brightness of the given row of pixels in the given frame is lower than a maximum brightness of an analog brightness range of the display device.

2. The method of claim 1, wherein each of the first time period and the second time period is a multiple of a time period of a pixel clock signal of the display device.

3. The method of claim 1, further comprising:
for a second frame of video being displayed on the display device, the second frame of video being different from the given frame of video:
enabling driving of the first row of pixels for a third time period of the second frame to emit light during the third time period, the light being emitted from the first row of pixels during the third time period being different in duration from the light being emitted from the first row of pixels during the first time period.

4. The method of claim 1, further comprising:
for a third frame of video being displayed on the display device, the third frame of video being different from the given frame of video:
enabling driving of the second row of pixels for a fourth time period of the third frame to emit light during the fourth time period, the light being emitted from the second row of pixels during the fourth time period being different in duration from the light being emitted from the second row of pixels during the second time period.

5. The method of claim 1, wherein the display device is an organic light emitting diode (OLED) display device.

6. A display device comprising a plurality of pixels at intersections of a plurality of scan lines and a plurality of data lines, the display device comprising:
a scan driver configured to enable pixels coupled to a selected one of the scan lines;
a data driver configured to drive data voltages to the pixels coupled to the selected one of the scan lines, the data driver including control circuitry configured to control an amount of time the selected one of the scan lines is enabled such that:
for a given frame of video being displayed on the display device,
a first row of pixels is enabled for a first time period of the given frame to emit light during the first time period;
a second row of pixels is enabled for a second time period of the given frame to emit light during the second time period, the light being emitted from the second row of pixels during the second time period being different in duration from the light being emitted from the first row of pixels during the first time period,
wherein the control circuitry comprises a plurality of counter circuits, each counter circuit configured to enable one or more pixels corresponding to one of the scan lines,
wherein a first counter circuit of the plurality of counter circuits configured to enable the first row of pixels is set to a first value corresponding to a number of clock periods within the first time period,
wherein a second counter circuit of the plurality of counter circuits configured to enable the second row of pixels is set to a second value corresponding to a number of clock periods within the second time period,
wherein the control circuitry is further configured to enable the first row of pixels for the first time period by initializing the first counter circuit to the first value based on a brightness level indicated by the given frame of video corresponding to the first row of pixels and to enable the second row of pixels for the second time period by initializing the second counter circuit to the second value based on a brightness level indicated by the given frame of video corresponding to the second row of pixels, and
wherein the control circuitry is further configured such that the first time period increases as the brightness level corresponding to the first row of pixels increases and wherein the second time period increases as the brightness level corresponding to the second row of pixels increases; and
a brightness resolution for a given row of pixels in the display device is increased independently from other rows of pixels in the display device by mapping a digital brightness resolution of the display device to a maximum brightness of the given row of pixels in the given frame when the maximum brightness of the given row of pixels in the given frame is lower than a maximum brightness of an analog brightness range of the display device.

7. The display device of claim 6, wherein the control circuitry is further configured such that each of the first time period and the second time period is a multiple of a time period of a pixel clock signal of the display device.

8. The display device of claim 6, wherein the control circuitry is further configured to control an amount of time the selected one of the scan lines is enabled such that:
for a second frame of video being displayed on the display device, the second frame of video being different from the given frame of video,
the first row of pixels is enabled for a third time period of the second frame to emit light during the third time period, the light being emitted from the first row of pixels during the third time period being different in duration from the light being emitted from the first row of pixels during the first time period.

9. The display device of claim 6, wherein the control circuitry is further configured to control an amount of time the selected one of the scan lines is enabled such that:
for a third frame of video being displayed on the display device, the third frame of video being different from the given frame of video,
the second row of pixels is enabled for a fourth time period of the third frame to emit light during the fourth time period, the light being emitted from the second row of pixels during the fourth time period being different in duration from the light being emitted from the second row of pixels during the second time period.

10. The display device of claim 6, wherein the display device is an organic light emitting diode (OLED) display device.

* * * * *